United States Patent
Shafer et al.

(10) Patent No.: US 9,440,169 B2
(45) Date of Patent: Sep. 13, 2016

(54) FUEL FILTRATION SYSTEM, FILTER EXCHANGE MODULE THEREFOR, AND METHOD OF REPLACING FUEL FILTERS

(75) Inventors: Scott F. Shafer, Morton, IL (US); Eric J. Herron, Chillicothe, IL (US); Alan W. Wells, Peoria, IL (US); Byron R. Wear, Bloomington, IL (US); Krishna K. Chinta, Grand Rapids, MI (US); Ye Tian, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 1036 days.

(21) Appl. No.: 13/554,261

(22) Filed: Jul. 20, 2012

(65) Prior Publication Data

US 2014/0021118 A1     Jan. 23, 2014

(51) Int. Cl.
| | |
|---|---|
| *B01D 29/50* | (2006.01) |
| *B01D 69/00* | (2006.01) |
| *B01D 35/26* | (2006.01) |
| *B01D 29/52* | (2006.01) |
| *F02M 37/08* | (2006.01) |
| *F02M 37/22* | (2006.01) |
| *B01D 29/56* | (2006.01) |
| *B01D 35/00* | (2006.01) |

(52) U.S. Cl.
CPC .............. *B01D 29/52* (2013.01); *B01D 29/56* (2013.01); *F02M 37/08* (2013.01); *F02M 37/22* (2013.01); *B01D 2201/302* (2013.01); *Y10T 29/4973* (2015.01)

(58) Field of Classification Search
CPC B01D 29/52; B01D 29/56; B01D 2201/302; F02M 37/08; F02M 37/22
USPC ......... 210/232, 340, 167.01, 167.02, 167.04, 210/167.31, 172.4, 194, 195.1, 252, 253, 210/258, 335, 443, 444, 489, 450, 416.4, 210/416.5, 416.1, 459
See application file for complete search history.

(56) References Cited

U.S. PATENT DOCUMENTS

| | | | |
|---|---|---|---|
| 5,149,433 A | 9/1992 | Lien | |
| 5,336,396 A * | 8/1994 | Shetley | ............................ 210/90 |
| 6,444,121 B1 | 9/2002 | Maxwell | |
| 7,040,299 B2 | 5/2006 | Dickerson | |
| 7,827,966 B2 | 11/2010 | Narisako et al. | |
| 7,883,627 B1 | 2/2011 | Barrett | |
| 8,114,285 B2 | 2/2012 | Reiland et al. | |
| 2004/0200763 A1* | 10/2004 | Liang | ............................... 210/90 |
| 2012/0042855 A1 | 2/2012 | Vogely et al. | |

* cited by examiner

Primary Examiner — Madeline Gonzalez (57) ABSTRACT

A fuel filtration system includes an electric pump, a filter assembly, and conduits for fluidly connecting the pump and filter assembly in series with a fuel tank to define a kidney filtration loop. The filter assembly includes a filter assembly head, including attachment openings therethrough, and a filter exchange module, including a mounting plate having externally threaded mounting connectors extending outwardly from one face thereof and internally threaded bores opening through another face thereof. In a mounted configuration, a fuel filter is threaded onto each mounting connector such that the filter is fluidly aligned with a fuel flow opening through the mounting plate, fasteners are positioned through the attachment openings and threadably received within the bores, and fuel flow passages of the filter assembly head define a flow distribution in which one pair of filters is fluidly in parallel and another pair of filters is fluidly in series.

14 Claims, 5 Drawing Sheets

FUEL FILTRATION SYSTEM, FILTER EXCHANGE MODULE THEREFOR, AND METHOD OF REPLACING FUEL FILTERS

TECHNICAL FIELD

The present disclosure relates generally to a fuel filtration system, and more particularly to a filter exchange module for the fuel filtration system including a mounting plate that supports a plurality of fuel filters and facilitates replacement of the fuel filters with respect to a filter assembly head.

BACKGROUND

Contamination of fuel supplies for engines can result in damage to both fuel injection system components and engine components. For example, abrasive particles, which may cause wear and potential leakage, can adversely affect performance of the fuel injection and engine components and reduce the long-term durability of the components. With respect to diesel fuel, excessive water in the fuel supply may cause rusting of certain system components and may negatively impact moving components, particularly during freezing conditions. Common rail fuel systems, which use precision valves exposed to high rail pressure to control operation of the fuel injectors, may be particularly susceptible to damage caused by debris in the fuel supply. One or more fuel filters are typically positioned along the line supplying fuel from the fuel supply, or tank, to the engine to capture debris and, with respect to diesel fuel, water. However, these filters may capture only a portion of the contaminants and, further, fuel cleanliness standards in different jurisdictions may vary greatly.

U.S. Patent Application Publication No. 2012/0042855 to Vogely et al. discloses a low power marine fuel polishing system. In particular, the Vogely reference is directed to a fuel polishing system utilizing a low power piezoelectric pump to circulate fuel from a fuel tank, through a filter, and then back to the fuel tank. The system is provided for a diesel fuel powered engine for a boat and is powered by a battery that is recharged by a solar energy panel. The Vogely et al. system offers a low power onboard alternative to high power fuel polishing systems utilizing a high power consumption pump, which requires that the boat be hooked up to power at a dock. As conceded in the Vogely reference, the disclosed fuel polishing system utilizes a low power consumption pump and appears to be directed primarily to water separation.

The present disclosure is directed to one or more of the problems or issues set forth above.

SUMMARY OF THE DISCLOSURE

In one aspect, a fuel filtration system includes an electric pump and a filter assembly including a filter assembly head and a filter exchange module. The filter assembly head defines a plurality of fuel flow passages and includes a plurality of attachment openings therethrough. The filter exchange module includes a mounting plate having a plurality of externally threaded filter mounting connectors extending outwardly from a first opposing face of the mounting plate and a plurality of internally threaded bores opening through a second opposing face of the mounting plate. In a mounted configuration, a fuel filter is threaded onto each of the externally threaded filter mounting connectors such that an inlet and an outlet of the fuel filter are aligned with a fuel flow opening through the mounting plate, fasteners are positioned through the attachment openings of the filter assembly head and threadably received within the internally threaded bores of the mounting plate, and the fuel flow passages of the filter assembly head define a flow distribution of the filter assembly in which at least a first pair of fuel filters is fluidly in parallel and at least a second pair of fuel filters is fluidly in series. The fuel filtration system also includes a set of conduits for fluidly connecting the electric pump and the filter assembly in series with a fuel tank to define a kidney filtration loop.

In another aspect, a method of replacing fuel filters of a fuel filtration system is provided. The fuel filtration system includes a set of conduits fluidly connecting an electric pump and a filter assembly in series with a fuel tank to define a kidney filtration loop. The filter assembly includes a filter assembly head and a filter exchange module. The method includes a step of supporting a first filter exchange module on the filter assembly head using a plurality of fasteners positioned through attachment openings of the filter assembly head and threadably received within internally threaded bores of a mounting plate of the first filter exchange module. The mounting plate of the first filter exchange module supports a first set of fuel filters. The method also includes a step of removing the first filter exchange module by removing the fasteners from threaded engagement with the internally threaded bores of the mounting plate of the first filter exchange module and withdrawing the fasteners from the attachment openings of the filter assembly head while the first set of fuel filters remain supported on the mounting plate of the first filter exchange module. A second filter exchange module is then attached to the filter assembly head by positioning the fasteners through the attachment openings of the filter head assembly and threadably receiving the fasteners within internally threaded bores of a mounting plate of the second filter exchange module. The mounting plate of the second filter exchange module supports a second set of fuel filters.

In another aspect, a filter exchange module for a fuel filtration system is provided. The fuel filtration system includes a set of conduits fluidly connecting an electric pump and a filter assembly in series with a fuel tank to define a kidney filtration loop. The filter assembly includes a filter assembly head and the filter exchange module. The filter exchange module includes a mounting plate having first and second opposing faces. A set of fuel flow openings is provided through the mounting plate, and a distribution of the fuel flow openings about the first and second opposing faces is symmetrical. A plurality of externally threaded filter mounting connectors extend outwardly from the first opposing face. Each of the externally threaded filter mounting connectors is centered relative to a corresponding one of the fuel flow openings. A plurality of internally threaded bores open through the second opposing face, and a distribution of the internally threaded bores about the second opposing face is symmetrical.

DETAILED DESCRIPTION

Figure 1:
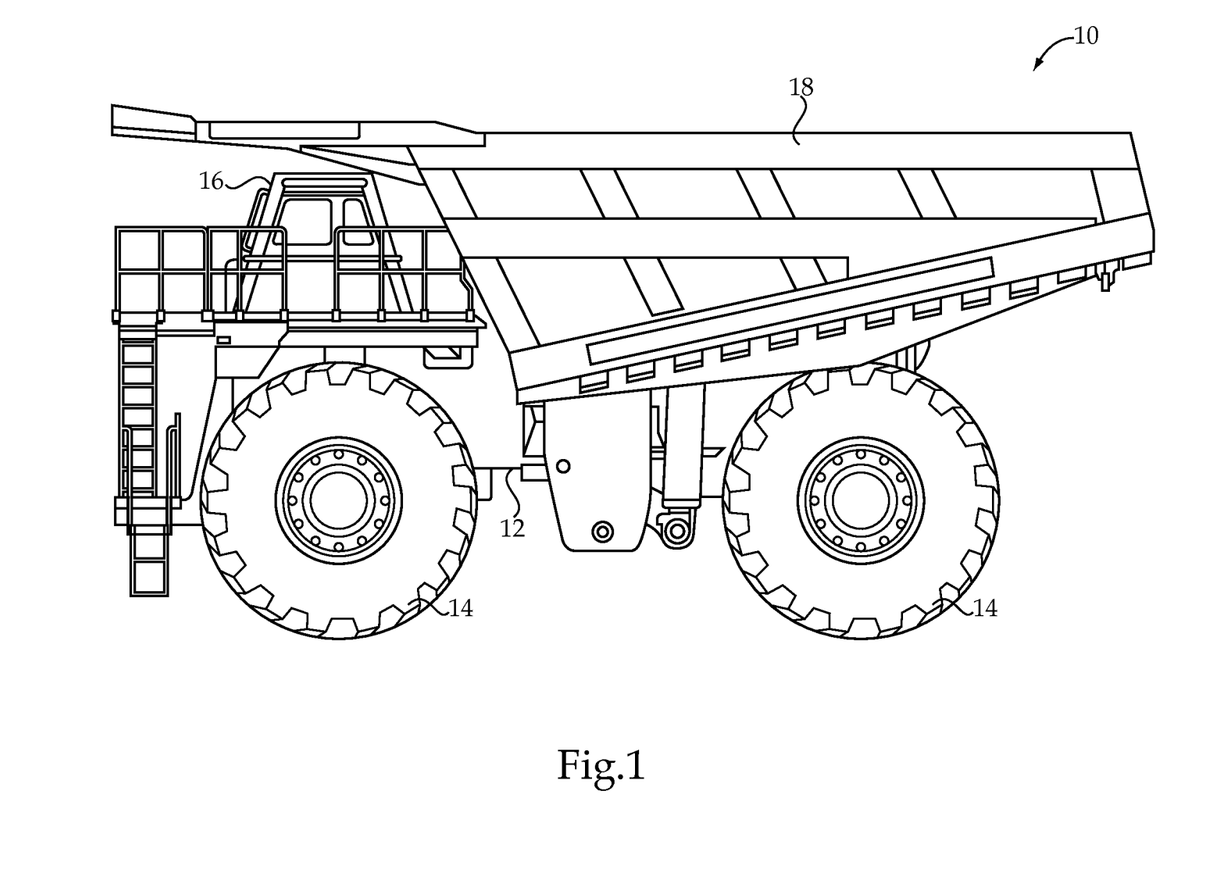
FIG. 1 is a side diagrammatic view of a machine having an onboard fuel filtration system, according to the present disclosure.

An exemplary embodiment of a machine 10, according to the present disclosure, is shown generally in FIG. 1. The machine 10 may be a mining truck, as shown, or may include any off-highway or on-highway vehicle using a fuel-powered engine, as described herein. The machine 10 generally includes a machine frame 12 for supporting, among other systems and components, an engine and fuel system, which will be discussed in greater detail in FIG. 2, and a plurality of ground-engaging elements 14. As should be appreciated, an engine of the engine and fuel system may provide propulsion power for the ground-engaging elements 14 and may power a variety of other machine systems, including various mechanical, electrical, and hydraulic systems and/or components. Although not within the scope of the present disclosure, the machine 10 may also include an operator control station 16, including a variety of operator controls and displays useful for operating the machine 10, and a dump body 18, which may be pivotable relative to the machine frame 12.

Figure 2:
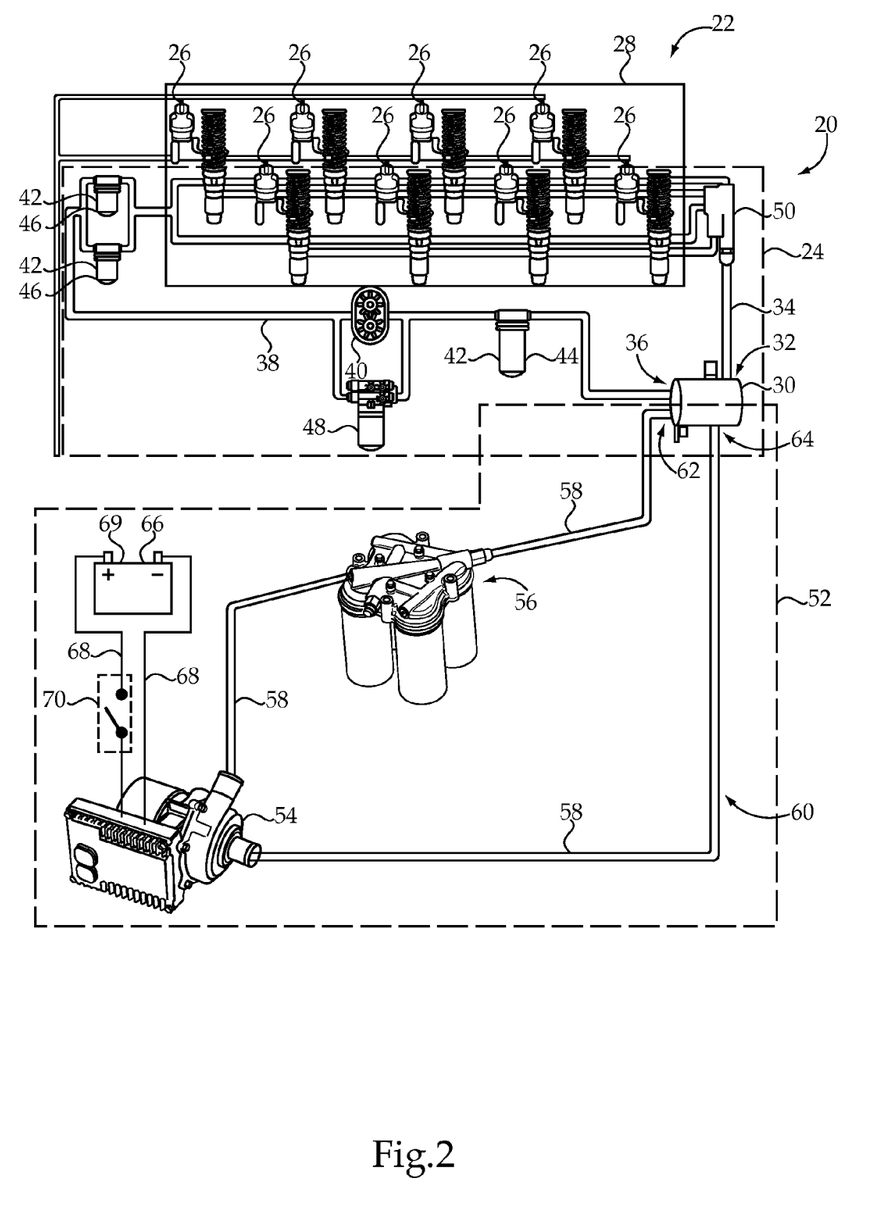
FIG. 2 is a schematic view of a machine engine and fuel system, including the fuel filtration system of FIG. 1, according to an exemplary embodiment of the present disclosure.

Turning now to FIG. 2, an exemplary embodiment of an engine and fuel system 20 of the machine 10 of FIG. 1 is shown. The engine and fuel system 20 may include an internal combustion engine 22 with an attached engine fueling system 24. The internal combustion engine 22, which may be a compression ignition engine, may comprise a plurality of fuel injectors 26, as is known in the art, and may also include an engine housing 28 to which the engine fueling system 24 is attached. The engine fueling system 24 may generally include a fuel tank 30 having an inlet 32 in fluid communication with a fuel return line 34, and an outlet 36 in fluid communication with a fuel supply line 38. A fuel transfer pump 40 may be positioned along the fuel supply line 38 for drawing low pressure fuel from the fuel tank 30 to pressurize and circulate the fuel to the plurality of fuel injectors 26. One or more fuel filters 42 may be positioned along the fuel supply line 38 for filtering particulates, or debris, and other contaminants, such as water, from the fuel. For example, a primary fuel filter 44 may be provided upstream from the fuel transfer pump 40, and one or more secondary fuel filters 46 may be provided downstream from the fuel transfer pump 40. As should be appreciated, the internal combustion engine 22 and engine fueling system 24 may include additional components and systems, including, but not limited to a priming pump 48 and a pressure regulator 50.

According to the present disclosure, the engine and fuel system 20 also includes a fuel filtration system 52, also referenced herein as a fuel polishing system. The fuel filtration system 52 generally includes an electric pump 54 and a filter assembly 56 connected in series with the fuel tank 30 using a set of conduits 58 to define a kidney filtration loop 60. In particular, the fuel tank 30 may include an additional inlet 62 and outlet 64, which may be independent from the inlet 32 and outlet 36 corresponding to the engine fueling system 24, for routing fuel along the kidney filtration loop 60. To fluidly connect the electric pump 54 and filter assembly 56 with the fuel tank 30 along the kidney filtration loop 60, conventional conduits 58, including hoses and fittings, may be used to interconnect the respective components via established ports.

According to the exemplary embodiment, the electric pump 54, may be electrically connected with an electrical power source 66 using electrical wiring 68. Although any suitable electrical power source 66 may be used, it may be preferred to supply electrical power to the electric pump 54 using a battery 69 of the machine 10. Utilizing the electric pump 54 rather than an engine driven pump may reduce hydraulic pulsations that may result during use of the latter. The electric pump 54 may be a 12 or 24 volt water pump offering single or variable speeds that is capable of providing a relatively high recirculation rate along the kidney filtration loop 60. Although a control strategy will not be discussed in detail herein, it is envisioned that the electric pump 54 may run continuously, may be electrically connected through an ignition key switch 70, as shown, to operate while the machine is "on," or may operate according to a control strategy directed by an electronic controller of the machine 10. For example, the electric pump 54 may be operated for a predetermined period of time or may be operated until a desired fuel cleanliness indication, as measured using an optical particle counter or other suitable device, is achieved.

As shown, the electric pump 54 may be positioned upstream from the filter assembly 56. However, according to other embodiments, the electric pump 54 may be positioned downstream from the filter assembly 56 to draw fuel through the filter assembly 56 rather than "pump" fuel through the filter assembly 56. According to some embodiments, the electric pump 54 may be positioned on the machine 10 such that the electric pump 54 is isolated as much as possible from vibrations of the internal combustion engine 22. In particular, it may be desirable to avoid mounting the electric pump 54 directly to the engine housing 28 in order to limit mechanical vibrations imparted by engine operation. As such, efficiency of the filter assembly 56 may be improved.

Figure 3:
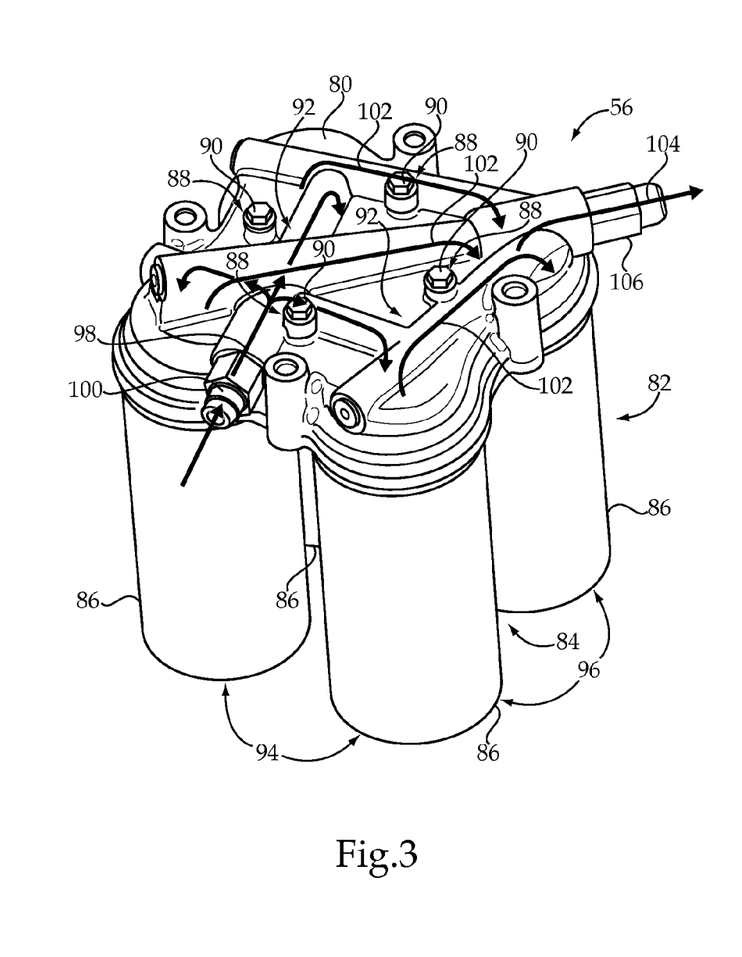
FIG. 3 is a perspective view of the filter assembly of the fuel filtration system shown in FIG. 2, according to one aspect of the present disclosure.

Turning now to FIG. 3, the filter assembly 56 of the fuel filtration system 52 will be discussed in greater detail. The filter assembly 56 generally includes a filter assembly head 80 and a filter exchange module 82, which includes a set 84 of fuel filters 86. The filter assembly head 80 includes a plurality of attachment openings 88 therethrough for receiving fasteners 90 and securing a mounted configuration of the filter assembly head 80 relative to the filter exchange module 82. The filter assembly head 80 also defines a plurality of fuel flow passages 92 that define a flow distribution of the filter assembly 56. According to a particular example, the flow distribution may include at least a first pair, such as pair 94, of fuel filters 86 fluidly in parallel and at least a second pair, such as pair 96, of fuel filters 86 fluidly in series. According to the flow distribution shown in FIG. 3, fuel may be directed along first flow paths 98 from an inlet 100, or inlet port, of the filter assembly head 80 and toward inlets of three fuel filters 86. The fuel flow passages 92, or a portion thereof, may also direct fuel from the outlets of those three fuel filters 86 to an inlet of a fourth fuel filter 86 along second flow paths 102. Finally, the fuel flow passages 92, or a portion thereof, may direct fuel along a third flow path 104 from the outlet of the fourth fuel filter 86 to an outlet 106 of the filter assembly head 80. Although a particular number of fuel filters 86 is shown and a particular series-parallel flow pattern is described, it should be appreciated that the filter assembly 56 described herein may support a different number of fuel filters 86 and a filter assembly head 80 having fuel flow passages 92 dictating an alternative fuel flow distribution may be provided. However, it is preferred that both series and parallel flow patterns be utilized to achieve desirable recirculation and filtration rates.

Figure 4:
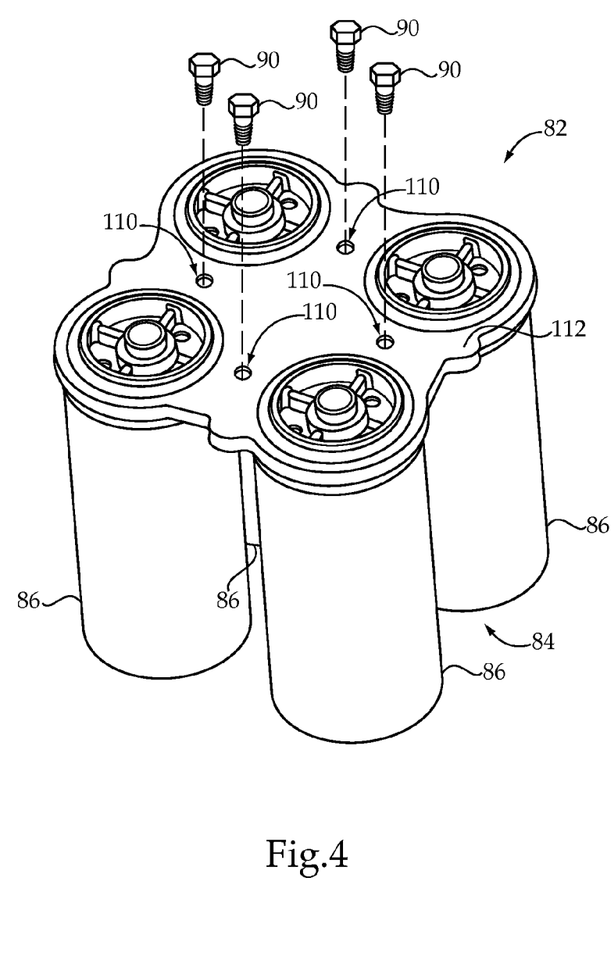
FIG. 4 is a perspective view of the filter exchange module of the filter assembly of FIGS. 2 and 3, according to another aspect of the present disclosure.

According to the mounted configuration, the fasteners 90 are positioned through the attachment openings 88 of the filter assembly head 80 and threadably received within internally threaded bores 110 of a mounting plate 112 of the filter exchange module 82, which is shown in FIG. 4 (with filter assembly head 80 removed). The filter exchange module 82 generally includes the mounting plate 112 and the set 84 of fuel filters 86. To exchange or remove the set 84 of fuel filters 86, which, according to the present disclosure, includes at least three fuel filters 86, the fasteners 90 are removed from threaded engagement with the internally threaded bores 110 of the mounting plate 112 and withdrawn from the attachment openings 88 of the filter assembly head 80 while the set 84 of fuel filters 86 remains supported on the mounting plate 112 (referring to FIGS. 3 and 4).

Figure 5:
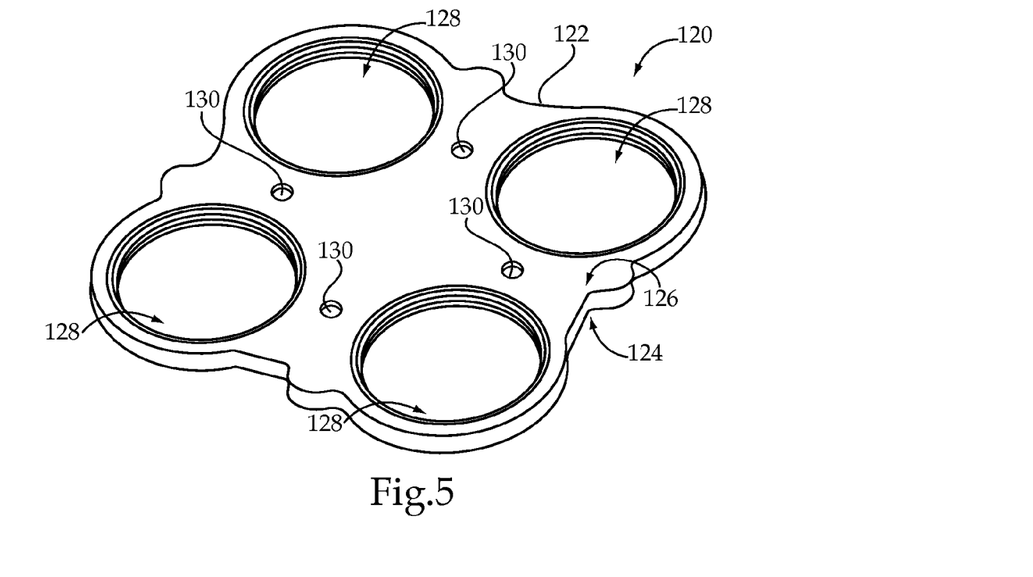
FIG. 5 is a top perspective view of a mounting plate of another exemplary filter exchange module, according to another aspect of the present disclosure.

The components of the filter exchange module 82 will now be described in the context of a method of replacing the fuel filters 86 for the fuel filtration system 52. As such, a replacement filter exchange module 120, through various stages of assembly, will now be discussed with initial reference to FIG. 5. A mounting plate 122 for the filter exchange module 120, or replacement filter exchange module, is shown and includes first and second opposing faces 124 and 126. A set of fuel flow openings 128, which may be circular, are formed through the mounting plate 122 and, according to the exemplary embodiment, have a symmetrical distribution about the first and second opposing faces 124 and 126. A plurality of internally threaded bores 130 open through the second opposing face 126, and may have a symmetrical distribution about the second opposing face 126. The internally threaded bores 130 may or may not extend entirely through a thickness of the mounting plate 122, depending on manufacturing preferences. Further, although four fuel flow openings 128 and four internally threaded bores 130 are shown, it should be appreciated that the number of features described herein may vary according to a particular application. Preferably, however, the distribution of features about the first and second opposing faces 124 and 126 is symmetrical to ease manufacturing and assembly of the components.

Figure 6:
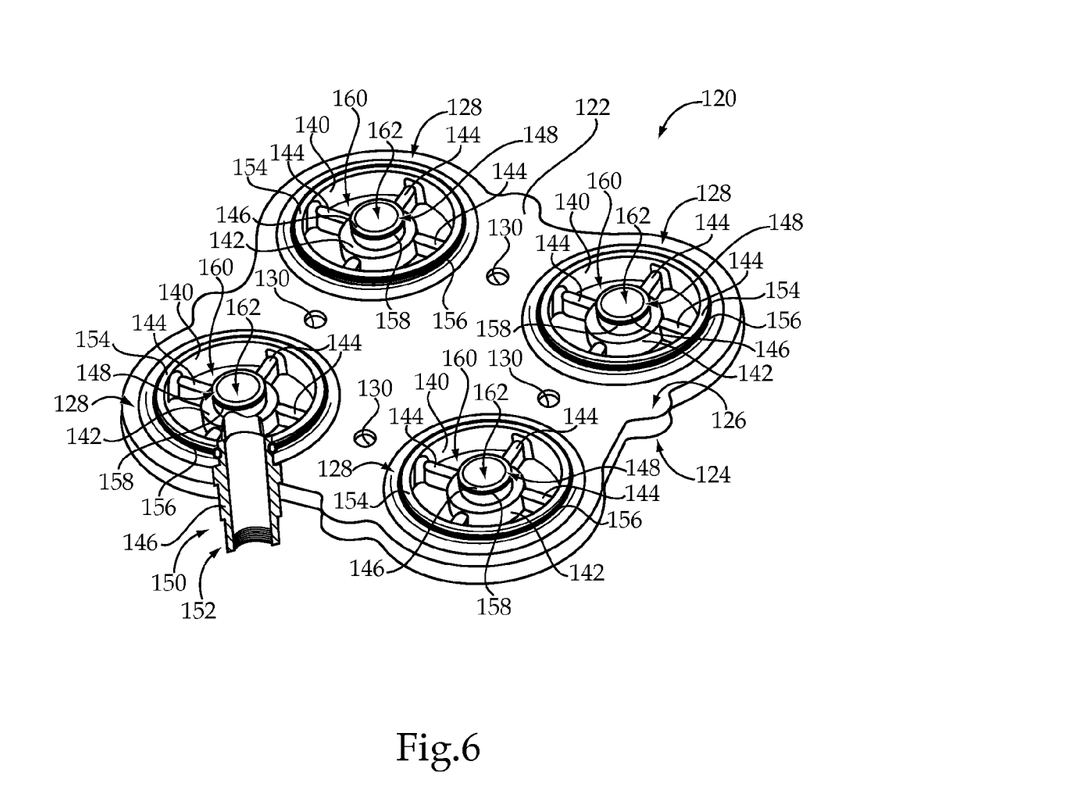
FIG. 6 is a top perspective view of the mounting plate of FIG. 5, including mounting adapters, sleeves, and sealing members supported within respective fuel flow openings of the mounting plate, according to another aspect of the present disclosure.

Turning now to FIG. 6, a mounting adapter 140 is positioned at least partially within each of the fuel flow openings 128. Each mounting adapter 140 may have an interference fit within the respective fuel flow opening 128 or may be secured within the fuel flow opening 128 using any other known attachment means. The mounting adapter 140 is circumferentially spaced from and supports a sleeve support ring 142, as shown. In particular, a set of radial support members 144 may interconnect the sleeve support ring 142 with the mounting adapter 140. The radial support members 144 may be selected to provide the desired structural support for the sleeve support ring 142, while also allowing fluid communication through the fuel flow opening 128, as will be described in greater detail below. A sleeve 146, which may have a cylindrical shape, is positioned through the sleeve support ring 142, with a first end 148 of the sleeve 146 extending outwardly from the second opposing face 126 and a second end 150 (shown in the partially sectioned portion of FIG. 6) of the sleeve 146 defining an externally threaded filter mounting connector 152. The sleeve 146 may also have an interference fit relative to the sleeve support ring 142 or, alternatively, the components may have a threaded engagement or may be secured together, as shown, using other known attachment means.

Sealing members, such as o-rings or other seals, may be provided on the filter exchange module 120 to provide appropriate sealing when the filter exchange module 120 is attached to the filter assembly head 80. In particular, the mounting adapter 140 may include an annular flange 154 extending outwardly from the second opposing face 126 and supporting a sealing member 156 thereon. In addition, the first end 148 of the sleeve 146 may support another sealing member 158 thereon. The sealing members 156 and 158 may be retained within designated grooves or may be otherwise adhered or fastened to the surface of respective components. According to the exemplary embodiment, the fuel flow passages 92 of the filter assembly head 80 may direct fuel through outer fuel passages 160, while fuel may be returned to the fuel flow passages 92 of the filter assembly head 80 through inner fuel passages 162. The sealing members 156 and 158 seal the described fuel flow at the interface between the filter assembly head 80 and the second opposing face 126 of the mounting plate 122.

Figure 7:
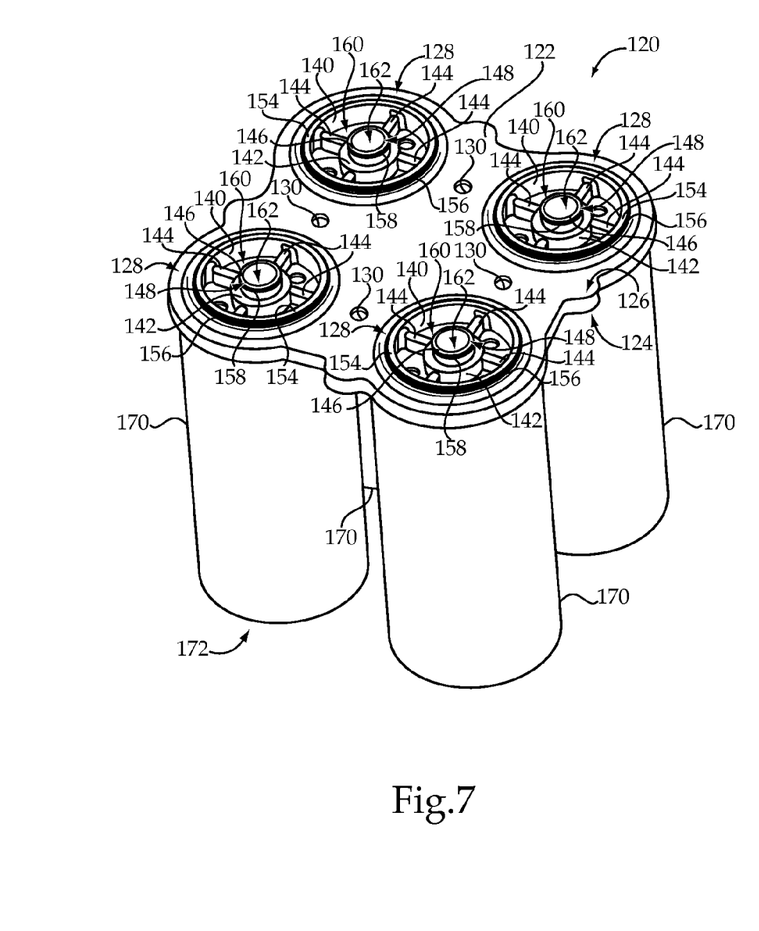
FIG. 7 is a perspective view of the mounting plate of FIGS. 5 and 6, including a set of fuel filters supported thereon, according to another aspect of the present disclosure.
Figure 8:
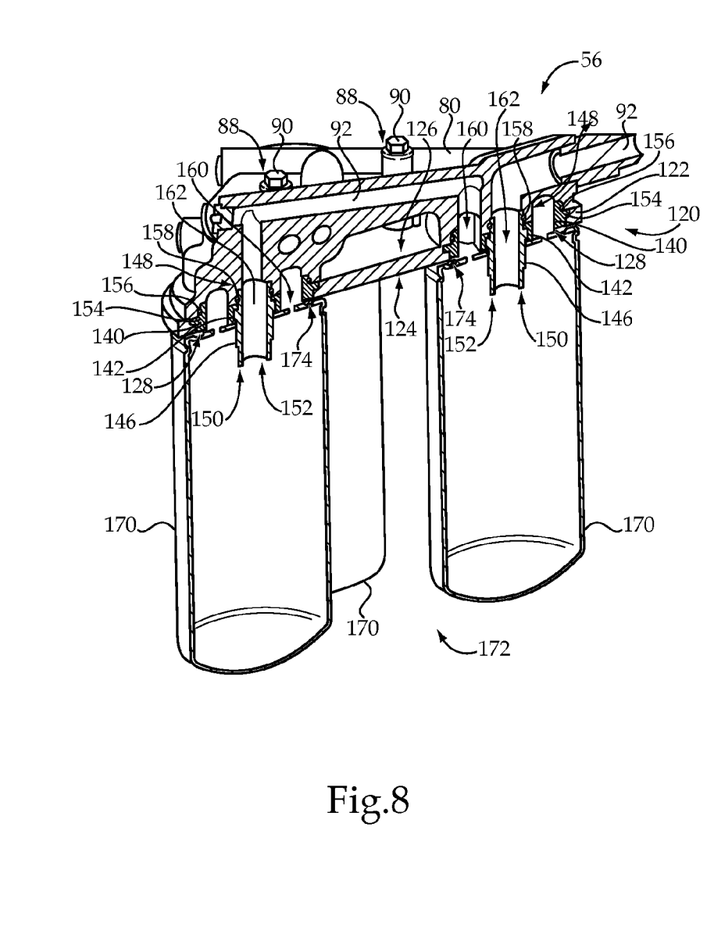
FIG. 8 is a cross sectional view of a filter assembly.

According to the mounted configuration, and referring now to FIG. 7, a fuel filter 170 of a replacement fuel filter set 172 may be threaded onto each of the externally threaded filter mounting connectors 152 (as shown in FIG. 6) such that inlets and outlets of the fuel filters 170 align with the respective fuel flow opening 128. For example, each fuel filter 170 may be a spin-on type fuel filter having a plurality of peripheral inlet openings and a central internally threaded outlet port through the same end of the filter housing. As should be appreciated, each externally threaded filter mounting connector 152 extends outwardly from the first opposing face 124 and is centered relative to a corresponding one of the fuel flow openings 128. A sealing member 174, shown in FIG. 8, may also be positioned between the fuel filter 170 and the first opposing face 124 of the mounting plate 122 to seal the fuel flow between the filter assembly head 80 and the respective fuel filter 170 at the interface between the fuel filter 170 and the first opposing face 124 of the mounting plate 122. As shown, the filter exchange module 120 may include four fuel flow openings 128, four externally threaded filter mounting connectors 152, and four fuel filters 170 threaded onto corresponding externally threaded filter mounting connectors 152. According to a specific example, each of the fuel filters 170 of the set 172 of fuel filters 170 may have the same loading rate. As such, the filter exchange module 120 may be attached to the filter assembly head 80 at a variety of different orientations.

With the filters 170 supported on the mounting plate 122, the filter exchange module 120 may be attached to the filter assembly head 80, and, thus, replace the previous set 84 of filters 86, by positioning the fasteners 90 through the attachment openings 88 of the filter head assembly 80 and threadably receiving the fasteners 90 within the internally threaded bores 130 of the mounting plate 122 of the filter exchange module 120. After attachment, as shown in the cross sectional view of FIG. 8, the set 172 of filters 170 has a secure and sealed fluid connection with the filter assembly head 80 through the mounting plate 122. As described above, the filter assembly head 80 includes the fuel flow passages 92, which may define a desired series-parallel flow pattern through the set 172 of filters 170.

INDUSTRIAL APPLICABILITY

The present disclosure finds potential application in any machine utilizing a fuel powered engine. Further, the present disclosure is applicable to machines utilizing fuel having a relatively high level of contaminants, including debris. For example, the present disclosure may be applicable to machines that may be utilized in different jurisdictions, which may be subject to different fuel cleanliness standards. Yet further, the present disclosure may be applicable to fuel systems particularly susceptible to damage caused by debris, such as common rail fuel systems.

Referring generally to FIGS. 1-8, a machine 10 may include an engine and fuel system 20, which includes an internal combustion engine 22 with an attached engine fueling system 24. The engine fueling system 24 may include a fuel tank 30 having an inlet 32 in fluid communication with a fuel return line 34, and an outlet 36 in fluid communication with a fuel supply line 38. A fuel transfer pump 40 may be positioned along the fuel supply line 38 for drawing low pressure fuel from the fuel tank 30 to pressurize and circulate the fuel to a plurality of fuel injectors 26. One or more fuel filters 42 may be positioned along the fuel supply line 38 for filtering particulates and other contaminants from the fuel. The engine and fuel system 20 may also include a fuel filtration system 52, also referenced herein as a fuel polishing system, to remove contaminants, including debris, from fuel stored within the fuel tank 20.

The fuel filtration system 52, which may be provided as a retrofit to machine 10, generally includes an electric pump 54 and a filter assembly 56 connected in series with the fuel tank 30 using a set of conduits 58 to define a kidney filtration loop 60. The filter assembly 56 generally includes a filter assembly head 80 and a filter exchange module 82, 120, which includes a set 84, 172 of fuel filters 86, 170. The filter assembly head 80 includes a plurality of attachment openings 88 therethrough for receiving fasteners 90, which ultimately secure a mounted configuration of the filter assembly head 80 relative to the filter exchange module 82, 120. The filter assembly head 80 includes a plurality of fuel flow passages 92 that define a flow distribution of the filter assembly 56. For example, it may be desirable to distribute fuel through the filter assembly 56 according to a series-parallel flow pattern.

The filter exchange module 82, 120 generally includes a mounting plate 112, 122 supporting the set 84, 172 of fuel filters 86, 170. A set of fuel flow openings 128 are formed through the mounting plate 122 and, support the fuel filters 86, 170 such that inlets and outlets of the fuel filters 86, 170 are in fluid communication with the fuel flow passages 92 of the filter assembly head 80 through the fuel flow openings 128. The mounting plate 122 also include a plurality of internally threaded bores 110, 130 opening through the second opposing face 126 and threadably receiving the fasteners 90 described above. The features of the mounting plate 122 may be symmetrically distributed about the opposing faces 124 and 126 to ease manufacturing and assembly. In addition, the fuel filters 86, 170 may each have the same loading rate to further simplify assembly.

Fuel from the fuel tank 30 may be directed along the kidney filtration loop 60 to improve the cleanliness of fuel stored in the fuel tank 30. A control strategy for utilizing the fuel filtration system 52, or kidney filtration loop 60, may include continuous operation, operation for a predetermined period of time, or operation that continues until a certain fuel cleanliness level is achieved. For example, it may be desirable to measure the debris content of the fuel and operate the fuel filtration system 52 until the debris content is lowered to an acceptable amount.

The fuel filtration system provided herein provides an effective means for improving the cleanliness of a fuel supply, such as fuel stored in a fuel tank, using a kidney filtration loop. The fuel filtration system may be retrofitted as an onboard system for any machine requiring improved fuel cleanliness. The fuel filtration system is designed to maximum fuel filtration efficiency by utilizing an electric pump providing a high fuel recirculation rate. For example, it may be desirable to provide a recirculation flow rate that is at least five times the fuel injection rate of the engine fueling system. The high recirculation rate may increase the amount of debris captured using the filters of the filter assembly.

Further, utilizing an electric pump, as opposed to a mechanical pump, such as an engine driven pump, may reduce the occurrence of hydraulic pulsations that may occur when using an engine driven pump. The electric pump, and other fuel filtration system components, may be mounted away from the engine in order to reduce mechanical vibrations inherent with engine operation. Reducing hydraulic pulsations and mechanical vibrations may also improve fuel filtration efficiency. The filter assembly head of the filter assembly may dictate a series-parallel flow pattern through the set of filters selected to provide both a capacity for achieving a desired flow rate and a desired fuel cleanliness level. The flow pattern, along with the loading rate of the fuel filters, may be selected to result in a similar filter life for all filters, while the filter exchange module configuration, as described above, allows for quick and easy exchange of the entire set of fuel filters.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A fuel filtration system, comprising:
an electric pump;
a filter assembly including a filter assembly head and a filter exchange module;
wherein the filter assembly head defines a plurality of fuel flow passages and includes a plurality of attachment openings therethrough;
wherein the filter exchange module includes a mounting plate having a plurality of externally threaded filter mounting connectors extending outwardly from a first opposing face of the mounting plate and a plurality of internally threaded bores opening through a second opposing face of the mounting plate;
wherein, in a mounted configuration, a fuel filter is threaded onto each of the externally threaded filter mounting connectors such that an inlet and an outlet of the fuel filter are aligned with a fuel flow opening through the mounting plate, fasteners are positioned through the attachment openings of the filter assembly head and threadably received within the internally threaded bores of the mounting plate, and the fuel flow passages of the filter assembly head define a flow distribution of the filter assembly in which at least a first pair of fuel filters is fluidly in parallel and at least a second pair of fuel filters is fluidly in series; and a set of conduits for fluidly connecting the electric pump and the filter assembly in series with a fuel tank to define a kidney filtration loop.

2. The fuel filtration system of claim 1, further including electrical wiring for electrically connecting the electric pump with an electrical power source.

3. The fuel filtration system of claim 1, further including at least one sealing member positioned between the fuel filter and the first opposing face of the mounting plate, and at least another sealing member positioned between the second opposing face of the mounting plate and the filter assembly head.

4. The fuel filtration system of claim 1, wherein a distribution of fuel flow openings about the first and second opposing faces of the mounting plate is symmetrical, and a distribution of the internally threaded bores about the second opposing face of the mounting plate is symmetrical.

5. The fuel filtration system of claim 1, wherein the mounting plate includes a mounting adapter positioned at least partially within the fuel flow opening, wherein the mounting adapter is circumferentially spaced from and supports a sleeve support ring.

6. The fuel filtration system of claim 5, further including a sleeve positioned through the sleeve support ring, wherein an end of the sleeve defines one of the externally threaded filter mounting connectors.

7. The fuel filtration system of claim 1, wherein the mounting plate includes four fuel flow openings, four externally threaded filter mounting connectors, and four fuel filters threaded onto corresponding externally threaded filter mounting connectors.

8. A filter exchange module for a fuel filtration system, the fuel filtration system including a set of conduits fluidly connecting an electric pump and a filter assembly in series with a fuel tank to define a kidney filtration loop, wherein the filter assembly includes a filter assembly head and the filter exchange module, the filter exchange module comprising:

a mounting plate having first and second opposing faces;

a set of fuel flow openings through the mounting plate, wherein a distribution of the fuel flow openings about the first and second opposing faces is symmetrical;

a mounting adapter positioned at least partially within each of the fuel flow openings, wherein the mounting adapter is circumferentially spaced from and supports a sleeve support ring;

a plurality of externally threaded filter mounting connectors extending outwardly from the first opposing face, wherein each of the externally threaded filter mounting connectors is centered relative to a corresponding one of the fuel flow openings; and a plurality of internally threaded bores opening through the second opposing face, wherein a distribution of the internally threaded bores about the second opposing face is symmetrical.

9. The filter exchange module of claim 8, further including a fuel filter threaded onto each of the externally threaded filter mounting connectors, wherein a first sealing member is positioned between the fuel filter and the first opposing face of the mounting plate.

10. The filter exchange module of claim 8, wherein the mounting adapter includes an annular flange extending outwardly from the second opposing face of the mounting plate, wherein the annular flange supports a second sealing member thereon.

11. The filter exchange module of claim 10, further including a sleeve positioned through the sleeve support ring, wherein a first end of the sleeve extends outwardly from the second opposing face of the mounting plate and supports a third sealing member thereon, and a second end of the sleeve defines one of the externally threaded filter mounting connectors.

12. The filter exchange module of claim 8, wherein the mounting plate includes four internally threaded bores.

13. The filter exchange module of claim 8, wherein the mounting plate includes four fuel flow openings, four externally threaded filter mounting connectors, and four fuel filters threaded onto corresponding externally threaded filter mounting connectors.

14. The filter exchange module of claim 13, wherein a loading rate of each of the four fuel filters is the same.

* * * * *